US006467350B1

(12) United States Patent
Kaduchak et al.

(10) Patent No.: US 6,467,350 B1
(45) Date of Patent: Oct. 22, 2002

(54) CYLINDRICAL ACOUSTIC LEVITATOR/ CONCENTRATOR

(75) Inventors: Gregory Kaduchak; Dipen N. Sinha, both of Los Alamos, NM (US)

(73) Assignee: The Regents of the University of California, Los Almos, NM (US)

( * ) Notice: Subject to any disclaimer, the term of this patent is extended or adjusted under 35 U.S.C. 154(b) by 27 days.

(21) Appl. No.: 09/810,905

(22) Filed: Mar. 15, 2001

(51) Int. Cl.$^7$ ............................................. B01D 17/06
(52) U.S. Cl. ..................... 73/570.5; 73/432.1; 210/748
(58) Field of Search ............................. 73/570.5, 432.1, 73/61.75, 64.53, 865.5, 626; 210/748, 738, 188; 209/155; 406/198; 367/137, 138, 191; 310/334, 336, 369

(56) References Cited

U.S. PATENT DOCUMENTS

| | | | | | |
|---|---|---|---|---|---|
| 3,882,732 | A | * | 5/1975 | Fletcher et al. | 181/0.5 |
| 4,523,682 | A | * | 6/1985 | Barmatz et al. | 181/0.5 |
| 4,604,542 | A | * | 8/1986 | Thompson | 310/334 |
| 5,831,166 | A | * | 11/1998 | Kozuka et al. | 210/748 |
| 6,055,859 | A | * | 5/2000 | Kozuka et al. | 210/748 |
| 6,216,538 | B1 | * | 4/2001 | Yasuda et al. | 210/748 |

OTHER PUBLICATIONS

E. H. Trinh, "Compact Acoustic Levitation Device for Studies in Fluid Dynamics and Material Science in the Laboratory and Microgavity" Rev. Sci. Instrum. 56, 2059–2065 (1985).
D. B. Thiessen and P. L. Marston, "Principles of some Acoustical, Electrical, and Optical Manipulation Methods with Applications to Drops, Bubbles, and Capillary Bridges" ASME Fluids Eng. Div. Publ. FED (1998).
M.A.H. Weiser and R. E. Apfel, "Extension of Acoustic Levitation to Include the Study of Micron–Size Particles in a more Compressible Host Liquid" J. Acoust. Soc. Am. 71, 1261–1268 (1982).
E.G. Lierke et al., "Acoustic Positioning for Space Processing of Materials Science Samples in Mirror Furnaces" in IEEE Ultrasonics Symposium 1129–1139 (1983).
K. Yasuda, "Blood Concentration by Superposition of Higher Harmonics of Ultrasound" Jpn. J. Appl. Phys. 36, 3130–3135 (1997).
P. Caperan et al., "Acoustic Agglomeration of a Glycol for Aerosol: Influence of Particle Concentration and Intensity of the Sound Field at Two Frequencies" J. Aerosol Sci. 26, 595–612 (1995).
G. Whitworth et al., "Transport and Harvesting of Suspended Particles Using Modulated Ultrasound" Ultrasonics 29, 439–444 (1991).
K.M. Martin and O.A. Ezekoye, "Acoustic Filtration and Sedimentation of Soot Particles" Experiments in Fluids 23, 483–488 (1997).
J.A. Gallego Juarez and G. Rodriguez Corral "Piezoelectric Transducer for Air–Borne Ultrasound" Acustica 29, 234–239 (1973).
M. Barmatz and P. Collas in "Acoustic Radiation Potential on a Sphere in Plane, Cylindrical, and Spherical Standing Wave Fields", J. Acoust. Soc. Am. 77, 928–945 (1985).

* cited by examiner

Primary Examiner—Hezron Willams
Assistant Examiner—Rose M. Miller
(74) Attorney, Agent, or Firm—Samuel M. Freund

(57) ABSTRACT

A low-power, inexpensive acoustic apparatus for levitation and/or concentration of aerosols and small liquid/solid samples having particulates up to several millimeters in diameter in air or other fluids is described. It is constructed from a commercially available, hollow cylindrical piezoelectric crystal which has been modified to tune the resonance frequency of the breathing mode resonance of the crystal to that of the interior cavity of the cylinder. When the resonance frequency of the interior cylindrical cavity is matched to the breathing mode resonance of the cylindrical piezoelectric transducer, the acoustic efficiency for establishing a standing wave pattern in the cavity is high. The cylinder does not require accurate alignment of a resonant cavity. Water droplets having diameters greater than 1 mm have been levitated against the force of gravity using; less than 1 W of input electrical power. Concentration of aerosol particles in air is also demonstrated.

28 Claims, 9 Drawing Sheets

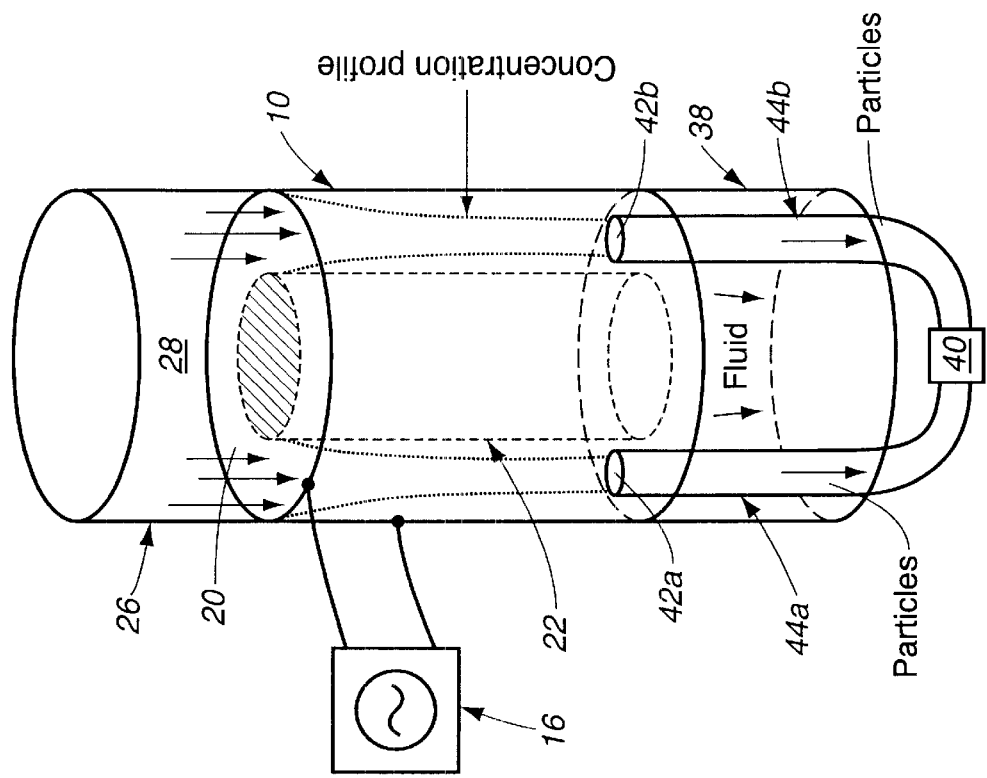
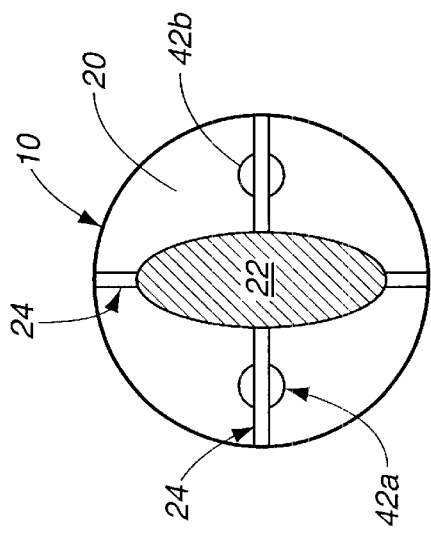

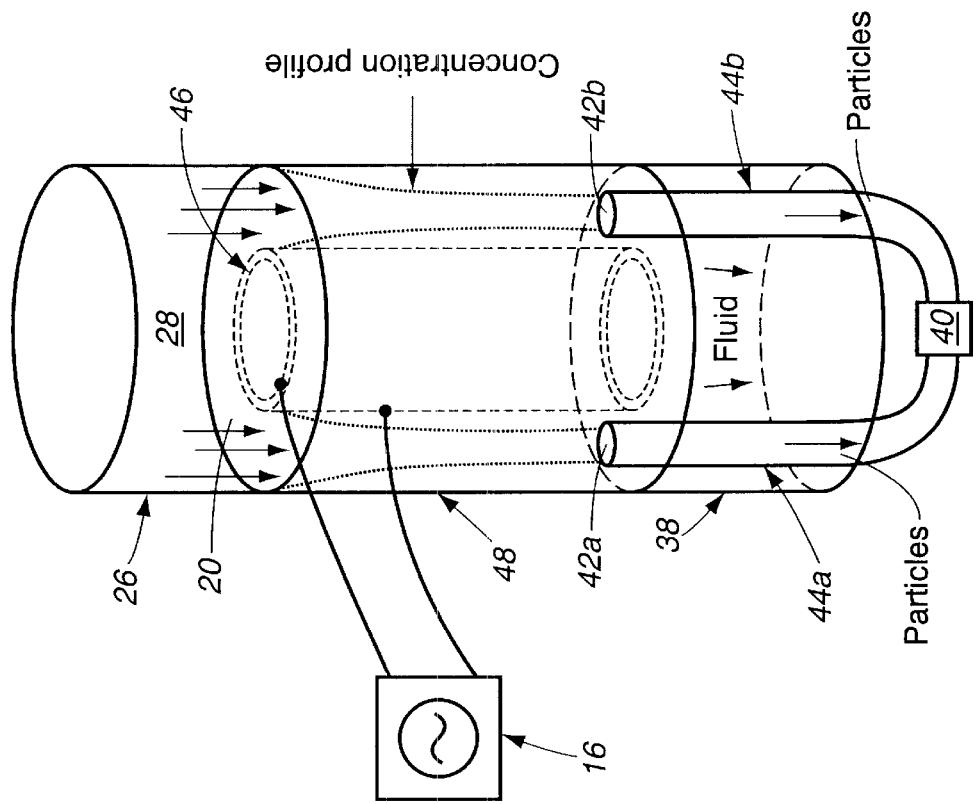
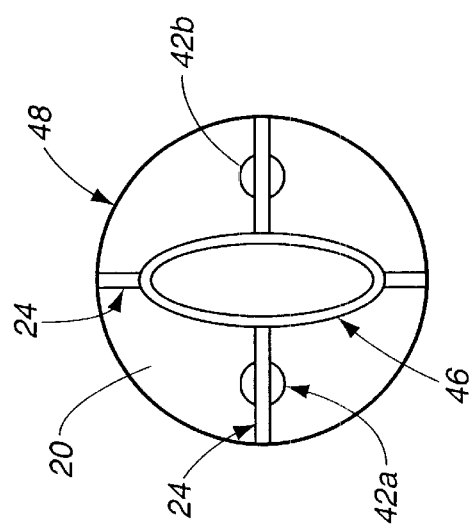
Fig. 7b
Fig. 7a

US 6,467,350 B1

CYLINDRICAL ACOUSTIC LEVITATOR/CONCENTRATOR

STATEMENT REGARDING FEDERAL RIGHTS

This invention was made with government support under Contract No. W-7405-ENG-36 awarded by the U.S. Department of Energy to The Regents of The University of California, and in part with support by the Defense Threat Reduction Agency of the Department of Defense. The government has certain rights in the invention.

FIELD OF THE INVENTION

The present invention relates generally to acoustic levitation and concentration and, more particularly, to the use of a hollow, cylindrical piezoelectric crystal for levitation and concentration which requires only low power and obviates the need for exact alignment of parts to generate standing waves.

BACKGROUND OF THE INVENTION

Acoustic levitation provides a means for isolating small samples of particles having diameters less than several millimeters without the influence of a containment vessel (See, e.g., E. H. Trinh, "Compact Acoustic Levitation Device For Studies In Fluid Dynamics And Material Science In The Laboratory And Microgravity" Rev. Sci. Instrum. 56, 2059–2065 (1985), D. B. Thiessen and P. L. Marston, "Principles Of Some Acoustical, Electrical, And Optical Manipulation Methods With Applications To Drops, Bubbles, And Capillary Bridges" ASME Fluids Eng. Div. Publ. FED (1998), M. A. H. Weiser and R. E. Apfel, "Extension Of Acoustic Levitation To Include The Study Of Micron-Size Particles In A More Compressible Host Liquid" J. Acoust. Soc. Am. 71,1261–1268 (1982), E. G. Lierke et al., "Acoustic Positioning For Space Processing Of Materials Science Samples In Mirror Furnaces" in IEEE Ultrasonics Symposium 1129–1139 (1983), K. Yasuda, "Blood Concentration By Superposition Of Higher Harmonics Of Ultrasound" Jpn. J. Appl. Phys. 36, 3130–3135 (1997), Ph. Caperan et al., "Acoustic Agglomeration Of A Glycol For Aerosol: Influence Of Particle Concentration And Intensity Of The Sound Field At Two Frequencies" J. Aerosol Sci. 26, 595–612 (1995), G. Whitworth et al., "Transport And Harvesting Of Suspended Particles Using Modulated Ultrasound" Ultrasonics 29, 439–444 (1991), and K. M. Martin and O. A. Ezekoye, "Acoustic Filtration And Sedimentation Of Soot Particles" Experiments in Fluids 23, 483488 (1997)). Most acoustic levitation devices operate by localizing a sample near the nodal planes of an acoustic standing wave. This has proven to be a viable technique for measuring material properties of small sample quantities (e.g. droplets, aerosols, etc.) without obscuring the results with the effects of, a mounting apparatus (See, e.g., M. A. H. Weiser and R. E. Apfel, supra, and E. G. Lierke et al., supra). Other applications include the use of acoustic forces to concentrate aerosols and/or particulates near the nodal planes of the field for harvesting or sedimentation purposes. Advances in the design of acoustic levitators over the past several decades have proven useful for applications where samples may reside in either gaseous or liquid host media.

The standing-wave field produced by an acoustic levitation device is strongly dependent upon the spatial alignment of the system components and often requires moderate to high electrical input power levels to drive the acoustic generators and achieve the desired levitation. This is especially true for levitating solid and liquid samples in air. The large acoustic impedance mismatch between the displacement-generating device and the air medium is often a difficult problem to overcome. Resonant transduction devices having Q >1000 have been built to address this problem and have proven quite useful when electrical power efficiency is not a limiting factor (See, e.g., D. B. Thiessen and P. L. Marston, supra, and J. A. Gailego Juarez and G. Rodriguez Corral "Piezoelectric Transducer For Air-Borne Ultrasound" Acustica 29, 234–239 (1973)).

Piezoelectric cylinders have received significant attention by industry. Such crystals are used for vibration damping, sources for sonar, sensors and actuators, motors and X-Y micropositioners, to name several uses.

Accordingly, it is an object of the present invention to provide an apparatus for efficiently achieving acoustic levitation and concentration which in its simplest embodiment is free from the requirement of careful alignment of its component members.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the method for concentrating particles suspended in a fluid hereof includes the steps of: matching the breathing-mode acoustic resonance of a hollow cylindrical piezoelectric transducer to the acoustic resonance of the interior volume thereof when filled with the fluid; applying periodic electrical excitation thereto such that resonant acoustic waves are generated in the interior volume of the cylindrical piezoelectric transducer; and subjecting the fluid having particles suspended therein to the equilibrium force pattern formed by the resonant acoustic waves such that the particles move to the region of the equilibrium force pattern and are concentrated thereby.

It is preferred that the step of matching the breathing-mode acoustic resonance of the cylindrical piezoelectric transducer to the acoustic resonance of the interior thereof when filled with the fluid is achieved by inserting a cylindrical-shaped shaped rod into the piezoelectric cylinder such that the axis of the cylindrical-shaped shaped rod is collinear with the axis of the piezoelectric cylinder.

Preferably, the length of the cylindrical-shaped rod is approximately the length of the cylindrical piezoelectric transducer and the diameter of the rod is chosen such that the length of the annular space between the cylindrical rod and the hollow cylindrical piezoelectric transducer along a radius thereof is an integral number of half-wavelengths of sound in the fluid inside of the annular space at the resonant frequency of the piezoelectric transducer.

In another aspect of the present invention in accordance with its objects and purposes the method for levitating particles in a fluid hereof includes the steps of: matching the breathing-mode acoustic resonance of a hollow, cylindrical piezoelectric transducer to the acoustic resonance of the interior thereof when filled with the fluid; applying periodic electrical excitation to the surface of the cylindrical piezoelectric transducer such that resonant acoustic waves are generated in the interior of the cylindrical piezoelectric transducer; and subjecting the particles to the equilibrium force pattern formed by the resonant acoustic waves such that the particles are levitated by the equilibrium force pattern.

Preferably the step of matching the breathing-mode acoustic resonance of a cylindrical piezoelectric transducer to the acoustic resonance of the interior thereof when filled with the fluid is achieved by inserting a cylindrical-shaped rod into the piezoelectric cylinder such that the axis of the cylindrical-shaped rod is collinear with the axis of the piezoelectric cylinder.

It is preferred that the length of the cylindrical-shaped rod is approximately the length of the cylindrical piezoelectric transducer and that the diameter of the rod is chosen such that the length of the annular space between the cylindrical insert and the hollow cylindrical piezoelectric transducer along a radius thereof is an integral number of half-wavelengths of sound in the fluid inside of the annular space at the resonant frequency of the cylindrical piezoelectric transducer.

Preferably also the fluid includes air.

In yet a further aspect of the present invention, in accordance with its objects and purposes the apparatus for concentrating particles suspended or entrained in a fluid hereof includes in combination: a cylindrical piezoelectric transducer having a hollow interior portion and wherein the breathing-mode acoustic resonance of the cylindrical piezoelectric transducer is matched to the acoustic resonance of the interior portion thereof when the interior portion is filled with the fluid; a function generator for applying periodic electrical excitation to the surface of the cylindrical piezoelectric transducer such that resonant acoustic waves in are generated in the hollow interior portion of the cylindrical piezoelectric transducer; and means for introducing the fluid having particles suspended or entrained therein into the region of the equilibrium force pattern formed by the resonant acoustic waves such that the particles move to the region of the equilibrium force pattern and are concentrated thereby.

Preferably, the apparatus includes a cylindrical-shaped rod disposed in the interior portion of said piezoelectric cylinder such that the axis of the cylindrical-shaped rod is collinear with the axis of the piezoelectric cylinder and forming thereby an annular region, whereby the breathing-mode acoustic resonance of the cylindrical piezoelectric transducer is matched to the acoustic resonance of the interior portion thereof when filled with said fluid.

It is preferred that the length of said cylindrical-shaped rod is approximately the length of the cylindrical piezoelectric transducer and that the diameter of the rod is chosen such that the length of the annular space between the cylindrical rod and the hollow cylindrical piezoelectric transducer along a radius thereof is an integral number of half-wavelengths of sound in the fluid inside of the annular space at the resonant frequency of the cylindrical piezoelectric transducer.

It is also preferred that the diameter of the cylindrical-shaped rod is twice the wavelength of sound within the fluid inside of the annular space at the resonant frequency of the piezoelectric transducer, whereby a single equilibrium force pattern is generated within the annular region.

In still another aspect of the invention in accordance with its objects and purposes the apparatus for levitating particles in a fluid hereof includes: a cylindrical piezoelectric transducer having a hollow interior portion such that the breathing-mode mode acoustic resonance thereof is matched to the acoustic resonance of the hollow interior portion thereof when filled with the fluid; a function generator for applying periodic electrical excitation to the surface of the cylindrical piezoelectric transducer whereby resonant acoustic waves are generated in the hollow interior portion of the cylindrical piezoelectric transducer; and means for introducing the particles into the equilibrium force pattern formed by the resonant acoustic waves such that the particles are suspended by the equilibrium force pattern.

Preferably, the apparatus includes a cylindrical-shaped rod disposed in the hollow interior portion of the piezoelectric cylinder such that the axis of the cylindrical-shaped rod is collinear with the axis of the piezoelectric cylinder forming thereby an annular region, whereby the breathing-mode acoustic resonance of the cylindrical piezoelectric transducer is matched with the acoustic resonance of the interior thereof when filled with the fluid.

It is preferred that the length of the cylindrical-shaped rod is approximately the length of the cylindrical piezoelectric transducer and that the diameter of the cylindrical-shaped rod is chosen such that the length of the annular region between the cylindrical insert and the hollow cylindrical piezoelectric transducer along a radius thereof is an integral number of half-wavelengths of sound in the fluid inside of the annular region at the resonant frequency of the cylindrical piezoelectric transducer.

Benefits and advantages of the present invention include low power operation, the commercial availability of hollow piezoelectric cylinders in numerous materials and sizes and freedom from exacting alignment requirements for component parts.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1a is a schematic representation of a perspective view of the hollow piezoelectric cylinder of the present invention, showing the outer and inner electrode structures which permit electric power to be applied to the cylinder, while

FIG. 3a is a graph of the normalized, time-averaged force experienced by a spherical water droplet in a cylindrical cavity having the same dimension as used in the demonstration of the apparatus of the present invention as a function of the distance from the cylinder axis, where the arrows correspond to the direction of the force and the black circles denote the stable equilibrium positions, while

FIG. 5a is a schematic representation of the top view of a second embodiment of the particle concentrator of the present invention wherein a cylindrical insert is disposed along the axis of the piezoelectric cylinder which has the effect of altering the three equilibrium mode pattern illustrated in FIG. 3b hereof to that of a single-mode pattern, while

FIG. 6a is a schematic representation of the top view of a third embodiment of the particle concentrator of the present invention wherein an elliptical insert is disposed along the axis of the piezoelectric cylinder which has the effect of altering the three equilibrium mode pattern illustrated in FIG. 3b hereof to that of two tubular patterns, while FIG. 6b is a schematic representation of a perspective view thereof.

FIG. 7a is a schematic representation of the top view of the apparatus illustrated in FIG. 6a hereof with the cylindrical insert thereof being replaced by an axially disposed cylindrical piezoelectric transducer and the outer piezoelectric transducer being replaced by a semi-rigid cylindrical pipe, while FIG. 7b is a schematic representation of a perspective view thereof.

DETAILED DESCRIPTION

Briefly, the present invention includes an apparatus for acoustic levitation and/or concentration of samples in fluids such as air. It is constructed from a commercially available, hollow cylindrical piezoelectric crystal which has been modified to tune the resonance frequency of the breathing mode resonance of the crystal to that of the interior cavity of the cylinder. When the resonance frequency of the interior cylindrical cavity is matched to the breathing mode resonance of the cylindrical piezoelectric transducer, the acoustic efficiency for establishing a standing wave pattern in the cavity is high.

Figure 1B:
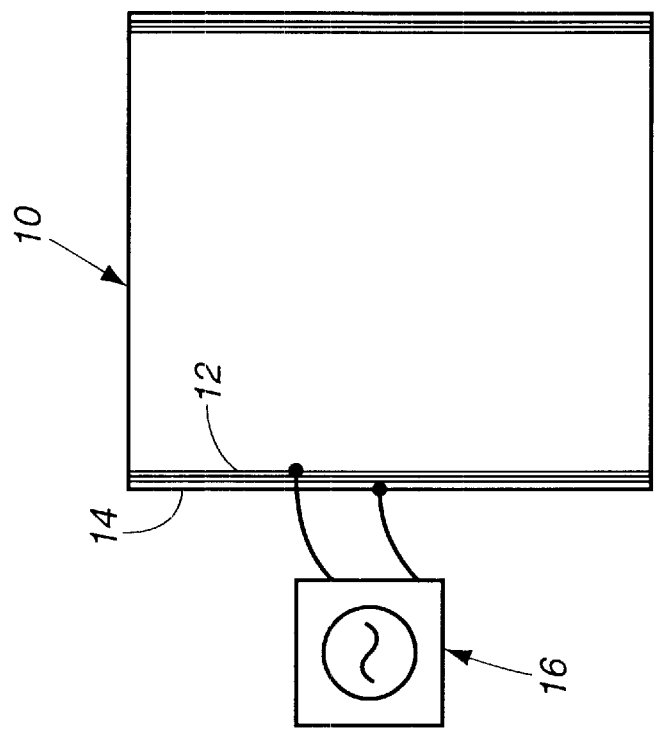
FIG. 1b is a side view thereof.
Figure 1A:
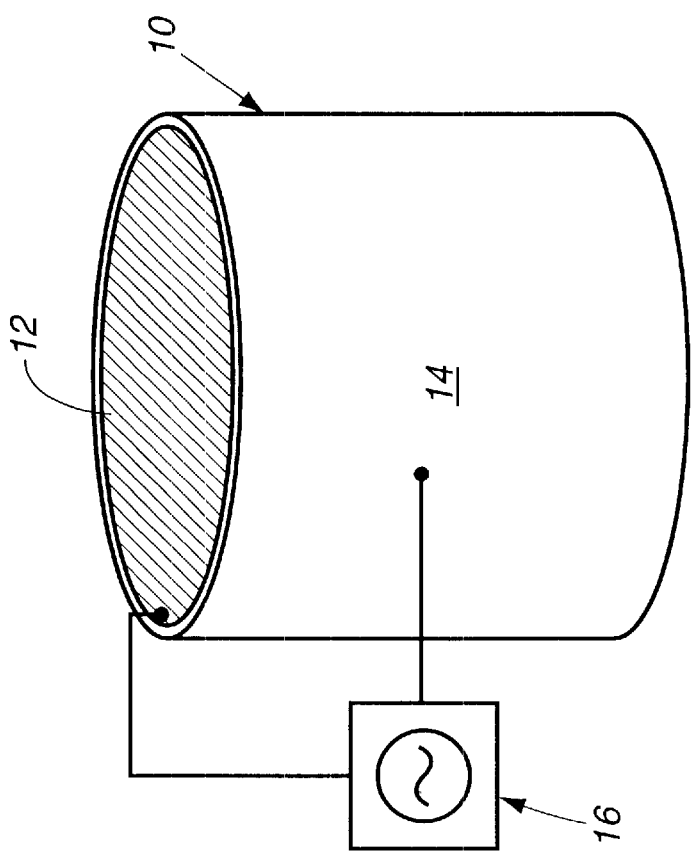

Reference will now be made in detail to the present preferred embodiments of the invention examples of which are illustrated in the accompanying drawings. Same or similar structure is identified using identical callouts. Turning now to the drawings, a diagram of the cylindrical levitator used to verify the teachings of the present invention is displayed in FIGS. 1a and 1b. Piezoelectric cylindrical shell, 10, having an inner diameter 16.9 mm, outer diameter 19.0, and length 17.0 mm was purchased from the Valpey-Fisher Corporation, Hopkinton, MA 01748 (VP-A55). The cylinder is radially poled with inner, 12, and outer, 14, nickel surface electrodes (silver has also been used) which are placed in electrical connection with function generator (oscillator), 16, which may include an amplifier if required. Typically, such cylinders are available from several manufacturers and in a plurality of dimensions and materials. Moreover, the direction of vibration of the cylindrical surface when stimulated using an electric sine-wave signal is determined by the direction of polarization. Although the cylinder used to demonstrate the present invention was fabricated from lead zirconate/lead titanate (PZT) and was poled (direction of polarization) in the radial direction at the factory, the present invention is not limited to such polarization nor is it limited to the use of PZT. Axial poling will also provide the desired breathing-mode vibrations of the hollow cylinder, since changes in the axial direction also affects the radial dimensions of the cylinder due to the finite Poisson ratio of the material. It should also be mentioned that electrical excitation of the piezoelectric transducer need not be sinusoidal in nature. Periodic electrical excitation having other waveforms would provide the appropriate excitation signal for the piezoelectric transducers of the present invention.

As stated hereinabove, it is necessary to match the frequency of the breathing-mode resonance of the cylindrical shell to the resonance frequency of the interior fluid-filled cavity. Measurements of the radial velocity using a commercial Doppler laser vibrometer demonstrate that a stock VP-A55 cylinder having the dimensions set forth hereinabove has two peaks and corresponding minima in the measured impedance, and the cylinder has an appreciable radial vibration amplitude in the regions about the impedance minima (near 59 kHz and 61 kHz at 20° C.). These minima are accompanied by a zero value of phase and the two resonance peaks in the impedance occur near the manufacturer's predicted value for the lowest-order radial mode (breathing mode). The resonance frequency of the interior of the cavity when filled with air as the operating fluid may be calculated from the Equation for U(r) set forth hereinabove using a value $c_{air}$=343 m/s at 20° C. is 65.54 kHz. It is therefore necessary to tune the resonance frequency of the piezoelectric cylinder such that it matches the resonance frequency of the cavity.

Figure 2:
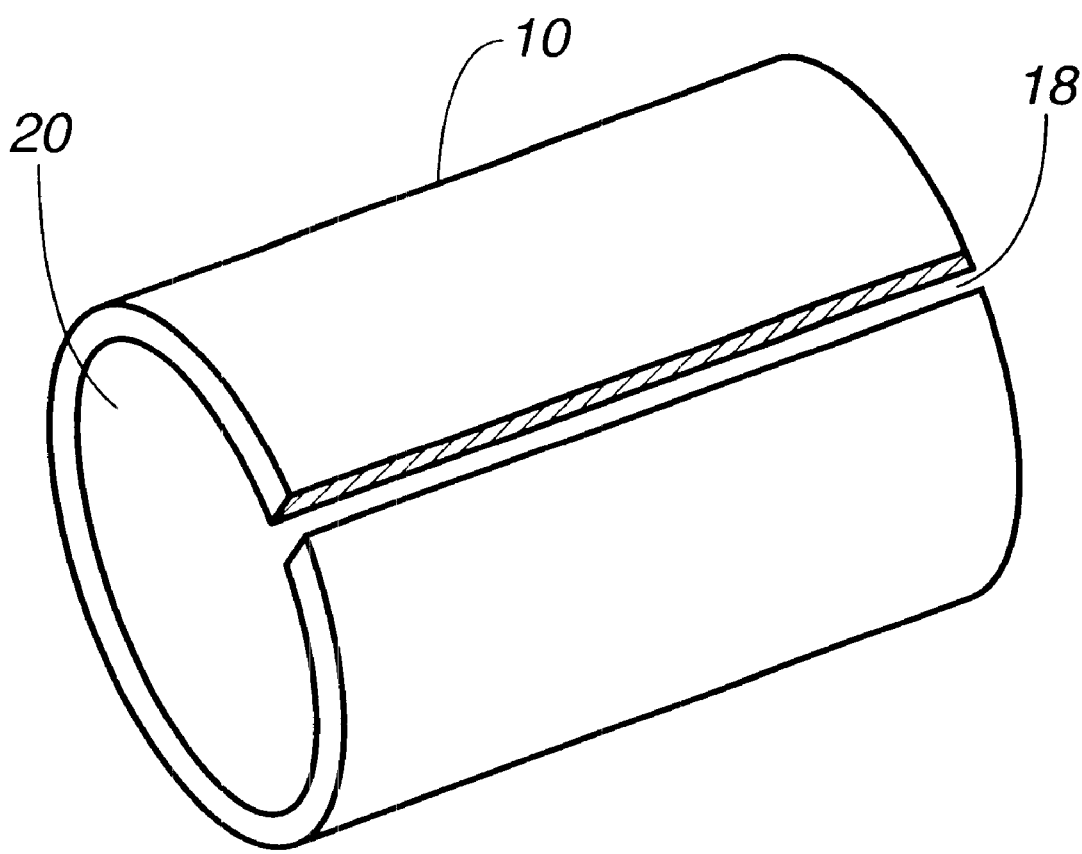
FIG. 2 is a schematic representation of a perspective view of the hollow PZT cylinder shown in FIG. 1 hereof illustrating the axial cut made in the wall of the cylinder for the purpose of tuning the breathing mode frequency of the cylinder to match a resonant mode of the fluid-filled interior of the cylinder.

Three procedures may be employed to accomplish this tuning. First, the resonance frequency of cylinder 10 can be tuned by cutting an axial slice, 18, out of the wall of cylinder 10 as shown in FIG. 2 hereof. Slice 18 having a width of approximately 0.50 mm, was made using a rotary diamond saw and was observed to shift the resonance frequency of the piezoelectric cylinder by 5–7 kHz to a single resonance peak which is approximately the resonance frequency of air-filled cavity, 20. Measurements made using a laser vibrometer demonstrate no. appreciable change in the radial vibration amplitude of the cylinder except in the vicinity of the slice where there is a marked decrease in vibration amplitude. It should be mentioned that a simple cut in the cylinder material parallel to the axis of the cylinder was also found to generate approximately the same shift in frequency.

Subsequent to the tuning procedure described hereinabove, it was found that the piezoelectric material composition of the cylinder could be selected to achieve the desired breathing-mode resonance frequency without having to physically alter the cylinder. As will be described hereinbelow, the cavity resonance can be tuned by placing an insert having appropriate dimensions into the cavity.

Although no mention is made as to how to generate such; a field, M. Barmatz and P. Collas in "Acoustic Radiation Potential On A Sphere In Plane, Cylindrical, And Spherical Standing Wave Fields", J. Acoust. Soc. Am. 77, 928–945 (1985)) disclose an expression for the radiation potential U of the acoustic force on a small spherical particle in a cylindrical standing-wave field. For axisymmetric normal modes, the potential may be written $$U(r) = \frac{\left(\frac{Y_1}{3}J_0^2(kr) - \frac{Y_2}{2}J_1^2(kr)\right)}{\pi R^3 \rho v_0^3},$$

where $$Y_1 = 1 - \frac{\rho c^2}{\rho_p c_p^2}, \text{ and } Y_2 = \frac{2(\rho_p - \rho)}{(2\rho_p + \rho)}.$$

Here c is the compressional velocity in air, ρ is the air density, $c_p$ is the compressional velocity of the particle, $\rho_p$ is the particle density, $v_p$ is the maximum particle velocity, and $J_n$ is a Bessel function of the first kind. The compressional wave number in air is k=2πf/c and r is the radial coordinate. For a cavity having rigid walls and inner radius R, the normal mode resonance frequencies are $f_n = cX_n/(2\pi R)$, where $X_n$ is the nth zero of $J_1(X_n) = 0$.

Figure 3A:
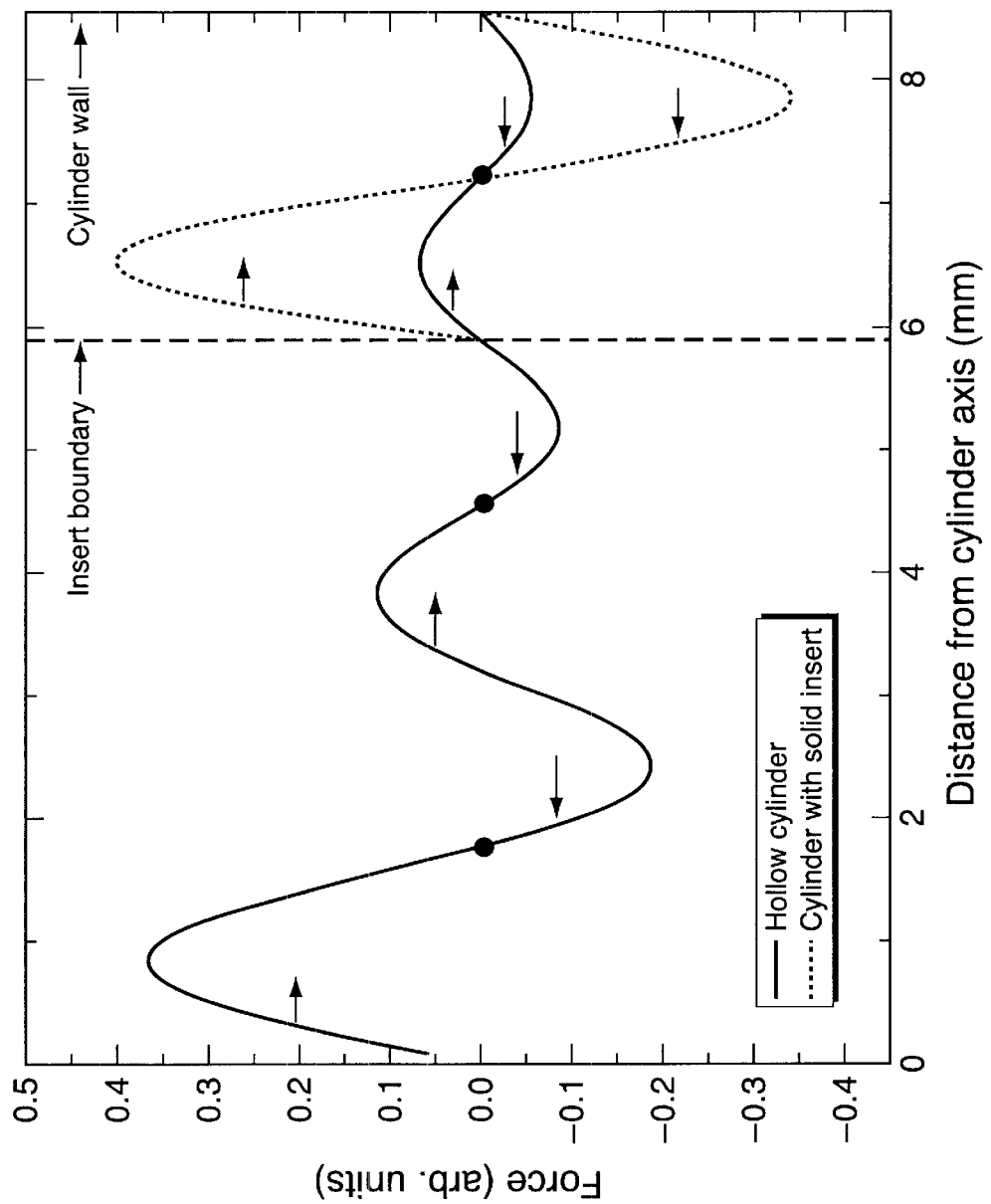
Figure 3B:
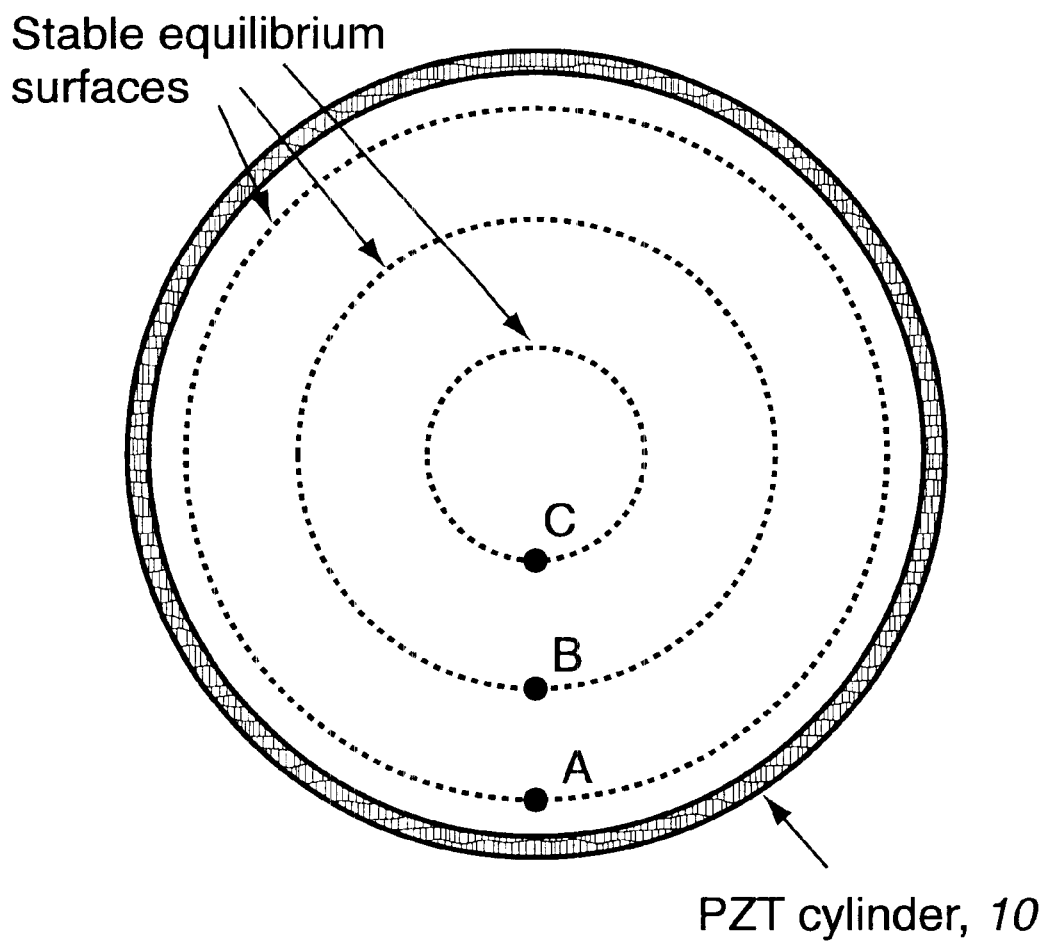
FIG. 3b is a schematic representation of the interior cavity of the cylindrical levitator/concentrator, where the dotted lines denote the stable equilibrium positions labeled A, B and C.

For the present application, the cavity resonance corresponding to n =3 applies to the hollow PZT cylinder. A plot of the time-averaged radial force on a particle in the cavity, F=−dU/dr, is shown in FIG. 3a. The parameters-used in the calculation correspond to a water droplet in air. The n=3 resonance condition possesses three stable equilibrium positions denoted by solid circles in the figure, where the net force is zero and restoring forces act in the direction of the equilibrium position. The restoring forces weaken as the distance from the center of the cavity increases. In the absence of other forces, these equilibrium positions define three concentric cylindrical surfaces in the cylindrical cavity. A cross section of these surfaces is shown in FIG. 3b. It should be noted that although the resonance frequency of the cavity is calculated assuming a rigid-walled cavity, measurements demonstrate that this model is a good approximation for the present invention.

If cylinder 10 is oriented such that the cylinder axis is approximately horizontal such that the force of gravity is directed radially, an oblate spheroid drop of water (major diameter 0.92 mm, minor diameter 0.55 mm) having a mass of 0.243 mg has been levitated with a measured input electrical power of approximately 115 mW (2.39×10$^{-6}$ N) using a 66.7 kHz sinusoid excitation frequency in the innermost pressure node ring of the cylinder (The ring marked "C" in FIG. 3b). Due to the low power requirements of the PZT cylinder it is driven directly from a function generator without the need for a power amplifier. The ambient temperature for this measurements was approximately 27° C. Because of the force pattern in the cavity, small droplets introduced into the cavity as a fine mist accumulate in the regions of force equilibrium and agglomerate to form visible droplets which are studied. Since both the resonance frequency of the crystal and the resonance frequency of the air-filled cavity are temperature dependent, resonance frequencies will vary slightly depending on the local temperature. It should be mentioned that other fine particles entrained or suspended in fluids are likely to coagulate in the regions of force equilibrium when introduced into the cylindrical PZT.

It has been observed that a finite restoring force also exists along the cylinder axis acting along the axis in the direction of midpoint of the cylinder. As a result of this force (most likely due to the finite length of the cylinder) the cavity exhibits a stable equilibrium position with appropriate restoring forces acting along the cylinder axis.

Visual inspection of the nodal pattern of the pressure field has been accomplished by introducing a small amount of water vapor into the cavity and observing the scattered light from the water droplets formed using Schlieren techniques when a diffuse white light illuminates the interior cylindrical cavity. The two innermost rings are readily discernable. More difficult to observe is the outermost ring which is visible in various locations near the interior wall of the device. The applied sinusoidal voltage necessary to concentrate the aerosol into the nodal rings has been observed to be less than 1.0 $V_{pp}$. Thus, the present apparatus both levitates and concentrates water droplets.

The breathing mode resonance of the cylinder has a measured quality factor, Q~100. As the temperature of the air in the cavity changes, the cavity resonance is expected change accordingly. To test the cavity stability, a standard spherical sample (mass=2.54 mg and diameter=1.4 mm) was levitated in the outermost ring of the cavity (labeled "A" in FIG. 3(b)). The drive amplitude was then lowered until the acoustic lifting force no longer exceeds the gravitational force on the water droplet and the droplet falls. The voltage and current were measured as a function of temperature and frequency of the drive signal. The driving frequency was found to vary between 66.1 kHz and 68.3 kHz as the temperature was increased from 20° C. to 50° C.

Figure 4:
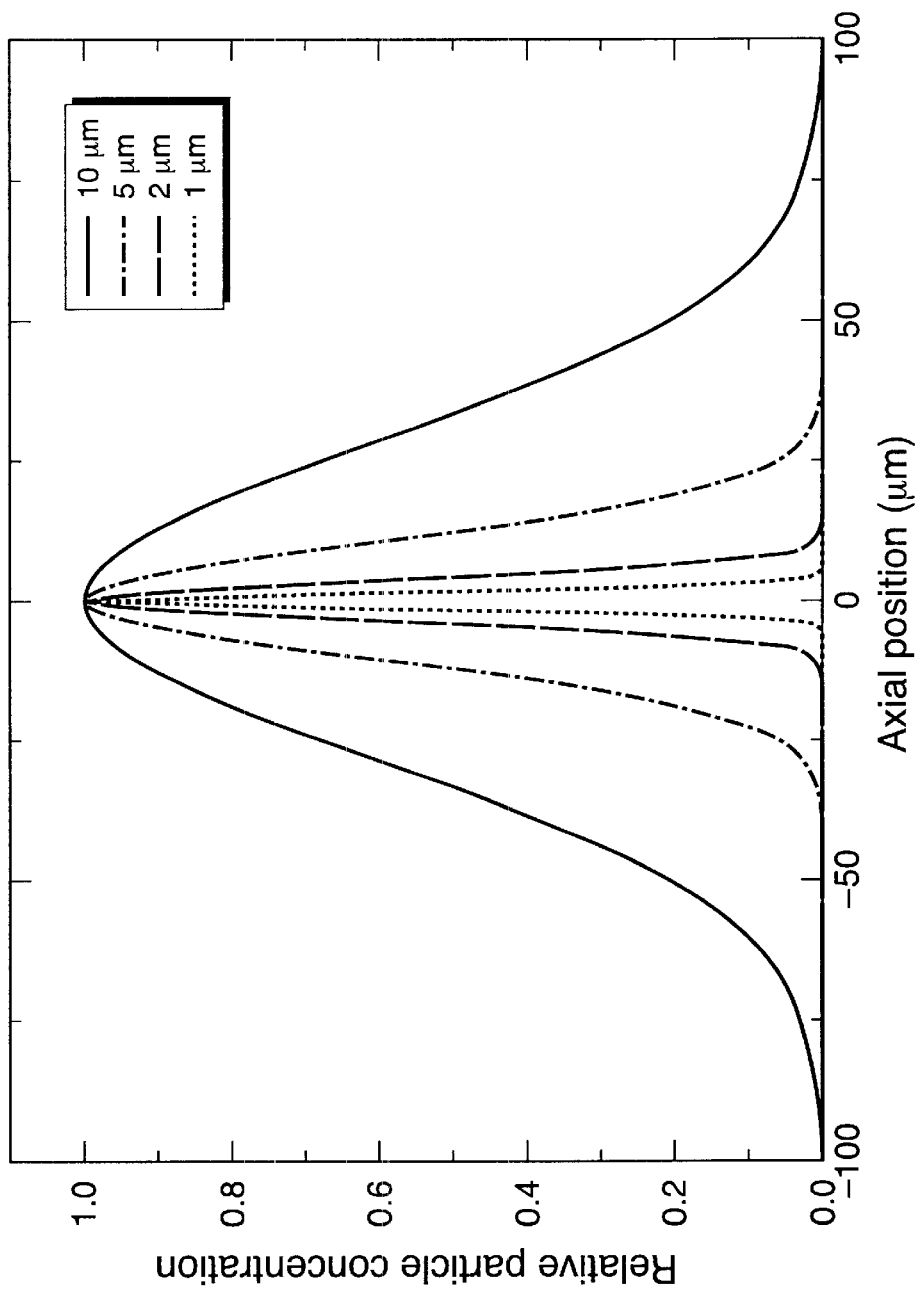
FIG. 4 is a graph of the particle concentration profile as a function of the distance from any of the equilibrium positions.

FIG. 4 is a graph of the particle concentration profile as a function of the distance from any of the equilibrium positions. The spread is inversely proportional to the particle density.

Figure 5B:
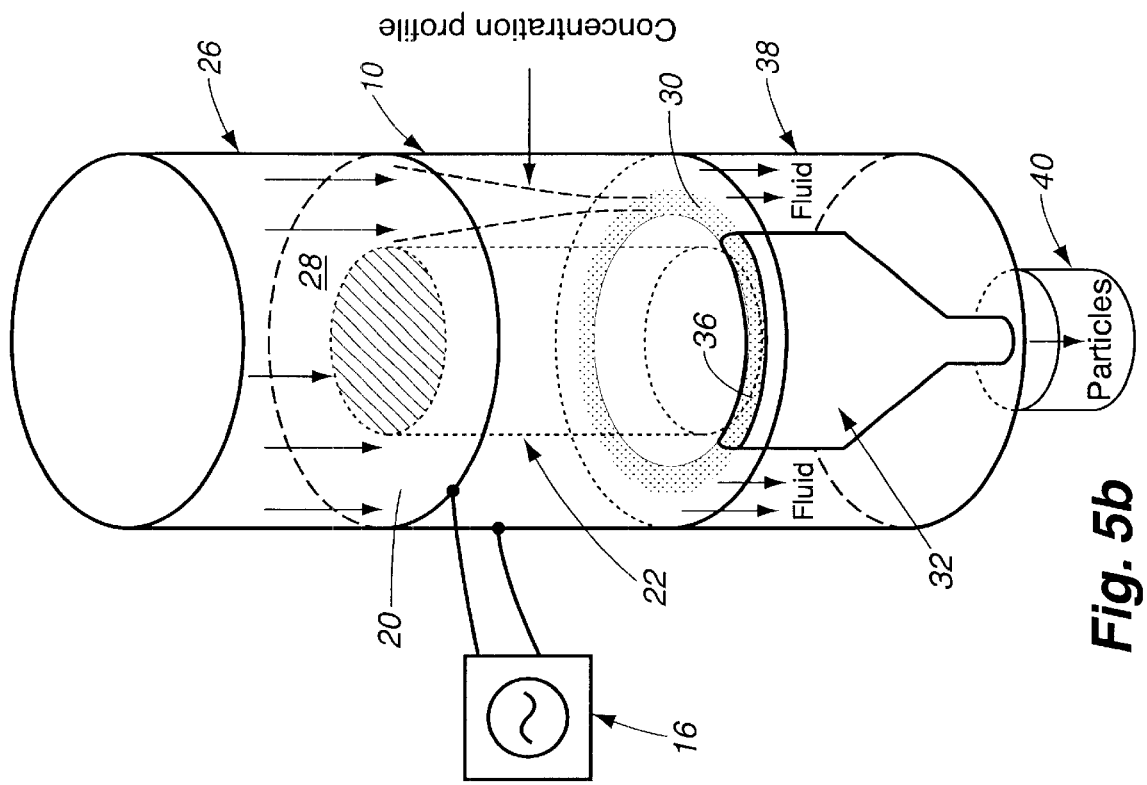
FIG. 5b is a schematic representation of a perspective view thereof.
Figure 5A:
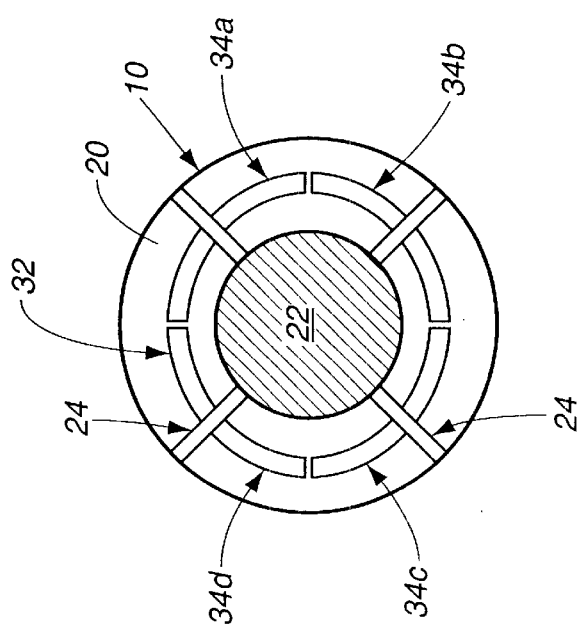

FIG. 5a is a schematic representation of the top view of another embodiment of the particle concentrator of the present invention, while FIG. 5b is a schematic representation of a perspective view thereof. Solid rod, 22, having a circular cross section, is located within cavity 20 of cylindrical resonator 10 collinear with the axis thereof by means of supports, 24, to allow tuning of the acoustic cavity. The length of the cylindrical insert is approximately the length of the cylindrical piezoelectric transducer. By changing the rod diameter, it is possible to shift the resonance frequency of the cavity. The diameter of the rod is chosen such that the length of the annular space between the cylindrical insert and the hollow cylindrical PZT along a radius thereof is an integral number of half-wavelengths of sound in the fluid inside of the annular space. Moreover, in order to generate but a single node within the annular region, the diameter of the cylindrical rod must be twice the wavelength of sound within the fluid inside of the annular space. Returning to the dotted portion of FIG. 3a, it is seen that the insertion of a rod results in the creation of a single force equilibrium node having a greater strength than those of any of A, B, or C shown in FIG. 3b. Means, 26, are provided for introducing a fluid, 28, containing particles, into cylinder 10. For example, a fan is utilized in the case of particulate-bearing air. In operation, the acoustic forces cause particles present in the cavity to collect near nodal plane, 30, as shown in the figure. The nodal plane is in the shape of a cylindrical sheet which extends the length of the cavity. Circular collector, 32, is placed directly under the nodal plane. In actuality, in order to separate the fluid from the particles, collector 32 comprises a plurality of hollow collectors (in the case illustrated, four), 34a–34d having one open end thereof, 36, in the vicinity of the nodal plane. Means, 38, for removing the fluid from piezoelectric cylinder 10 and for collecting the separated particles, 40, are also provided. In the case of particulate-bearing air, a fan can be used in this position in place of a fan as means 26. Thus, as the fluid enters the top of the apparatus and flows through the cavity particulates are forced to positions near the nodal line. Upon reaching the collector, the particulates are separated from the fluid stream with the main air stream being ejected from the device.

FIG. 6a is a schematic representation of the top view. of a third embodiment of the particle concentrator of the present invention, while FIG. 6b is a schematic representation of a perspective view thereof. Here, circular cross-section section tuning rod 22 shown in FIGS. 5a and 5b is replaced with a rod having an elliptical cross section and having its central axis along that for piezoelectric cylinder 10. This changes the spatial response of the cavity such that the particles collect near two nodal circles, 42a and 42b. The collectors, 44a and 44b, are now in the shape of small 'straws'. Otherwise, this embodiment operates in a similar manner to that illustrated in FIGS. 5a and 5b hereof.

FIG. 7a is a schematic representation of the top view of the apparatus illustrated in FIG. 6a hereof where the elliptical insert 22 has been replaced by axially disposed elliptical piezoelectric transducer, 46, and the outer piezoelectric transducer is replaced by rigid cylindrical pipe, 48, while FIG. 7b is a schematic representation of a perspective view thereof. This embodiment operates in a similar manner to that for the embodiment illustrated in FIGS. 6a and 6b hereof. Likewise, replacing cylindrical insert 22 in FIGS. 5a and 5b with a cylindrical piezoelectric transducer and cylindrical piezoelectric transducer 10 with a rigid cylinder, would generate an apparatus which operates in a similar manner to the apparatus illustrated in FIGS. 5a and 5b.

Figure 8:
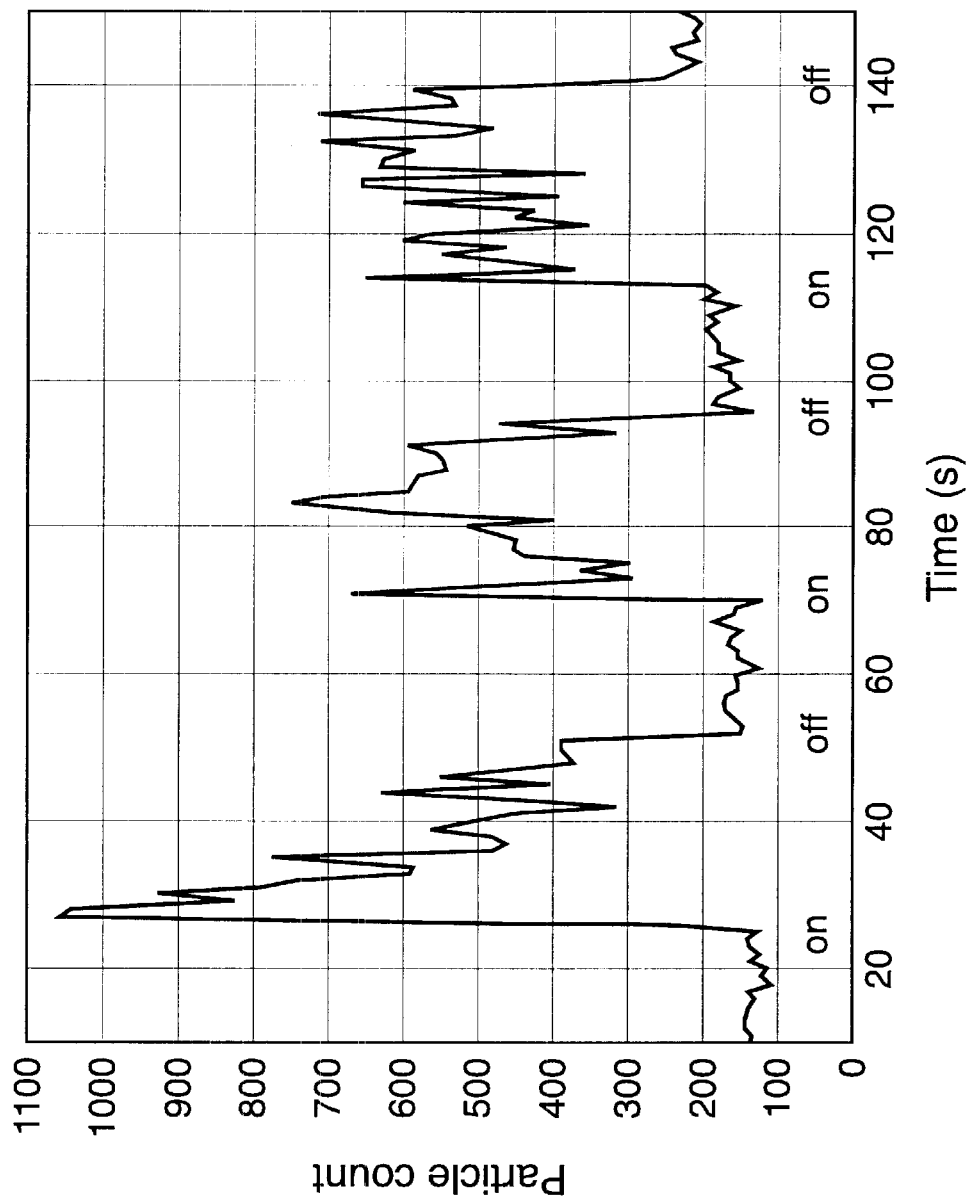
FIG. 8 is a graph of the particle count as a function of time for the apparatus shown in FIGS. 6a and 6b hereof showing the increase and decrease of particle reaching a detector as the acoustic energy is repeatedly turned on and turned off, respectively.

FIG. 8 is a graph of the particle count as a function of time for the apparatus shown in FIGS. 6a and 6b hereof showing the increase and decrease of particle reaching a detector as the acoustic energy is repeatedly turned on and turned off, respectively. The fluid employed was air and the suspended particulates were dust particles. The commercial particle sizer was adjusted to view approximately 0.5 $\mu$m particles.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for concentrating particles suspended or entrained in a fluid which comprises the steps of:
   (a) matching the breathing-mode acoustic resonance of a hollow, cylindrical piezoelectric transducer to the acoustic resonance of the hollow interior thereof when filled with said fluid;
   (b) applying periodic electrical excitation to the surface of the cylindrical piezoelectric transducer such that resonant acoustic waves are generated in the interior of the cylindrical piezoelectric transducer; and
   (c) subjecting the fluid having particles suspended or entrained therein to the equilibrium force pattern formed by the resonant acoustic waves such that the particles move to the region of the equilibrium force pattern and are concentrated thereby.

2. The method as described in claim 1, wherein said step of matching the breathing-mode acoustic resonance of a cylindrical piezoelectric transducer to the acoustic resonance of the interior thereof when filled with said fluid is achieved by inserting a cylindrical-shaped rod into the piezoelectric cylinder such that the axis of the cylindrical-shaped rod is collinear with the axis of the piezoelectric cylinder.

3. The method as described in claim 2, wherein the length of the cylindrical-shaped shaped rod is approximately the length of the cylindrical piezoelectric transducer and wherein the diameter of the rod is chosen such that the length of the annular space between the cylindrical rod and the hollow cylindrical piezoelectric transducer along a radius thereof is an integral number of half-wavelengths of sound in said fluid inside of the annular space at the resonant frequency of the cylindrical piezoelectric transducer.

4. The method as described in claim 3, wherein the diameter of the cylindrical-shaped rod is twice the wavelength of sound within said fluid inside of the annular space at the resonant frequency of the piezoelectric transducer, whereby a single equilibrium force pattern is generated within the annular region.

5. The method as described in claim 1, wherein said step of matching the breathing-mode acoustic resonance of a cylindrical piezoelectric transducer to the acoustic resonance of the interior thereof when filled with said fluid is achieved by inserting an elliptical-shaped rod into the piezoelectric cylinder such that the axis of the center of the elliptical-shaped rod is collinear with the axis of the piezoelectric cylinder.

6. The method as described in claim 5, wherein the length of the elliptical-shaped rod is approximately the length of the cylindrical piezoelectric transducer.

7. The method as described in claim 1, further comprising the step of flowing said fluid having particles suspended or entrained therein through the cylindrical piezoelectric transducer.

8. The method as described in claim 1, further comprising the step of separating the concentrated particles from said fluid having particles suspended or entrained therein.

9. The method as described in claim 1, wherein said fluid comprises air.

10. A method for levitating particles in a fluid which comprises the steps of:
    (a) matching the breathing-mode acoustic resonance of a hollow, cylindrical piezoelectric transducer to the acoustic resonance of the interior thereof when filled with said fluid;
    (b) applying periodic electrical excitation to the surface of the cylindrical piezoelectric transducer such that resonant acoustic waves are generated in the interior of the cylindrical piezoelectric transducer; and
    (c) subjecting the particles to the equilibrium force pattern formed by the resonant acoustic waves such that the particles are suspended by the equilibrium force pattern.

11. The method as described in claim 10, wherein said step of matching the breathing-mode acoustic resonance of a cylindrical piezoelectric transducer to the acoustic resonance of the interior thereof when filled with said fluid is achieved by inserting a cylindrical-shaped rod into the piezoelectric cylinder such that the axis of the cylindrical-shaped rod is collinear with the axis of the piezoelectric cylinder.

12. The method as described in claim 11, wherein the length of the cylindrical-shaped shaped rod is approximately the length of the cylindrical piezoelectric transducer and wherein the diameter of the rod is chosen such that the length of the annular space between the cylindrical rod and the hollow cylindrical piezoelectric transducer along a radius thereof is an integral number of half-wavelengths of sound in said fluid inside of the annular space at the resonant frequency of the cylindrical piezoelectric transducer.

13. The method as described in claim 10, wherein said fluid comprises air.

14. An apparatus for concentrating particles suspended or entrained in a fluid which comprises in combination:
    (a) a cylindrical piezoelectric transducer having a hollow interior portion and wherein the breathing-mode acoustic resonance of said cylindrical piezoelectric transducer is matched to the acoustic resonance of the interior portion thereof when the interior portion is filled with said fluid;

(b) a function generator for applying periodic electrical excitation to the surface of said cylindrical piezoelectric transducer such that resonant acoustic waves in are generated in the hollow interior portion of the cylindrical piezoelectric transducer; and (c) means for introducing the fluid having particles suspended or entrained therein into the region of the equilibrium force pattern formed by the resonant acoustic waves such that the particles move to the region of the equilibrium force pattern and are concentrated thereby.

15. The apparatus as described in claim 14, further comprising a cylindrical-shaped shaped rod disposed in the interior portion of said piezoelectric cylinder such that the axis of said cylindrical-shaped rod is collinear with the axis of said piezoelectric cylinder forming thereby an annular region, whereby the breathing-mode acoustic resonance of said cylindrical piezoelectric transducer is matched to the acoustic resonance of the interior portion thereof when filled with said fluid.

16. The apparatus as described in claim 15, wherein the length of said, cylindrical-shaped rod is approximately the length of said cylindrical piezoelectric transducer and wherein the diameter of the rod is chosen such that the length of the annular space between said cylindrical rod and said hollow cylindrical piezoelectric transducer along a radius thereof is an integral number of half-wavelengths of sound in said fluid inside of the annular space at the resonant frequency of said cylindrical piezoelectric transducer.

17. The apparatus as described in claim 16, wherein the diameter of said cylindrical-shaped rod is twice the wavelength of sound within said fluid inside of the annular space at the resonant frequency of said piezoelectric transducer, whereby a single equilibrium force pattern is generated within the annular region.

18. The apparatus as described in claim 14, further comprising an elliptical-shaped rod disposed in the hollow interior portion of said piezoelectric cylinder such that the axis of the center of said elliptical-shaped rod is collinear with the axis of said piezoelectric cylinder, whereby the breathing-mode acoustic resonance of said cylindrical piezoelectric transducer is matched to the acoustic resonance of the hollow interior portion thereof when filled with said fluid.

19. The apparatus as described in claim 18, wherein the length of said elliptical-shaped rod is approximately the length of said cylindrical piezoelectric transducer.

20. The apparatus as described in claim 14, further comprising means for flowing said fluid having particles suspended or entrained therein through said cylindrical piezoelectric transducer.

21. The apparatus as described in claim 14, further comprising means for separating the concentrated particles from said fluid having particles suspended or entrained therein.

22. The apparatus as described in claim 14, wherein said fluid comprises air.

23. An apparatus for levitating particles in a fluid which comprises in combination:

(a) a cylindrical piezoelectric transducer having a hollow interior portion such that the breathing-mode acoustic resonance thereof is matched to the acoustic resonance of the hollow interior portion thereof when filled with said fluid;

(b) a function generator for applying periodic electrical excitation to the surface of said cylindrical piezoelectric transducer whereby resonant acoustic waves are generated in the hollow interior portion of said cylindrical piezoelectric transducer; and (c) means for introducing the particles into the equilibrium force pattern formed by the resonant acoustic waves such that the particles are suspended by the equilibrium force pattern.

24. The apparatus as described in claim 23, further comprising a cylindrical-shaped rod disposed in the hollow interior portion of said piezoelectric cylinder such that the axis of said cylindrical-shaped rod is collinear with the axis of said piezoelectric cylinder forming thereby an annular region, whereby the breathing-mode acoustic resonance of said cylindrical piezoelectric transducer is matched with the acoustic resonance of the interior thereof when filled with said fluid.

25. The apparatus as described in claim 24, wherein the length of said cylindrical-shaped shaped rod is approximately the length of said cylindrical piezoelectric transducer and wherein the diameter of said cylindrical-shaped rod is chosen such that the length of the annular region between said cylindrical insert and said hollow cylindrical piezoelectric transducer along a radius thereof is an integral number of half-wavelengths of sound in said fluid inside of the annular region at the resonant frequency of said cylindrical piezoelectric transducer.

26. The apparatus as described in claim 23, wherein said fluid comprises air.

27. A method for concentrating particles suspended or entrained in a fluid which comprises the steps of:

(a) matching the breathing-mode acoustic resonance of a hollow, cylindrical piezoelectric transducer to the acoustic resonance of the volume formed between the cylindrical piezoelectric transducer and a rigid cylinder surrounding the cylindrical piezoelectric transducer and coaxial thereto when the volume is filled with said fluid;

(b) applying periodic electrical excitation to the surface of the cylindrical piezoelectric transducer such that resonant acoustic waves are generated in the volume between the cylindrical piezoelectric transducer and the rigid cylinder; and (c) subjecting the fluid having particles suspended or entrained therein to the equilibrium force pattern formed by the resonant acoustic waves such that the particles move to the region of the equilibrium force pattern and are concentrated thereby.

28. An apparatus for concentrating particles suspended or entrained in a fluid which comprises in combination:

(a) a hollow, cylindrical piezoelectric transducer;

(b) a rigid cylinder surrounding said cylindrical piezoelectric transducer and coaxial thereto, forming a volume therebetween such that the breathing-mode acoustic resonance of said cylindrical piezoelectric transducer is matched to the acoustic resonance of the volume when the volume is filled with said fluid;

(c) a function generator for applying periodic electrical excitation to the surface of the cylindrical piezoelectric transducer such that resonant acoustic waves are generated. in the volume between the cylindrical piezoelectric transducer and the rigid cylinder; and (d) means for introducing the fluid having particles suspended or entrained therein into the region of the equilibrium force pattern formed by the resonant acoustic waves such that the particles move to the region of the equilibrium force pattern and are concentrated thereby.

* * * * *